(12) United States Patent
Sameshima

(10) Patent No.: US 9,484,764 B2
(45) Date of Patent: Nov. 1, 2016

(54) CHARGE CONTROL DEVICE AND DRIVE LOAD MODULE

(75) Inventor: Hiroshi Sameshima, Nara (JP)

(73) Assignee: OMRON Corporation, Kyoto (JP)

( * ) Notice: Subject to any disclaimer, the term of this patent is extended or adjusted under 35 U.S.C. 154(b) by 195 days.

(21) Appl. No.: 14/004,766

(22) PCT Filed: Mar. 23, 2011

(86) PCT No.: PCT/JP2011/056962
§ 371 (c)(1),
(2), (4) Date: Sep. 12, 2013

(87) PCT Pub. No.: WO2012/124156
PCT Pub. Date: Sep. 20, 2012

(65) Prior Publication Data
US 2014/0002029 A1  Jan. 2, 2014

(30) Foreign Application Priority Data

Mar. 15, 2011 (JP) .................. 2011-056380

(51) Int. Cl.
*H02J 7/00* (2006.01)
*H01M 10/44* (2006.01)
*H01M 10/46* (2006.01)

(52) U.S. Cl.
CPC .............. *H02J 7/007* (2013.01); *H02J 7/0021* (2013.01); *H02J 2007/004* (2013.01); *H02J 2007/0037* (2013.01)

(58) Field of Classification Search
USPC ........................................................ 320/101
See application file for complete search history.

(56) References Cited

U.S. PATENT DOCUMENTS

| | | | |
|---|---|---|---|
| 6,301,198 B1 | 10/2001 | Otaka et al. | |
| 2006/0244424 A1 | 11/2006 | Nelson | |
| 2009/0140698 A1* | 6/2009 | Eberhard | H02J 7/045 320/152 |
| 2009/0302681 A1* | 12/2009 | Yamada et al. | 307/46 |
| 2011/0193518 A1* | 8/2011 | Wright et al. | 320/101 |

FOREIGN PATENT DOCUMENTS

| | | |
|---|---|---|
| JP | H06-323154 A | 11/1994 |
| JP | H10-66271 A | 3/1998 |
| JP | 2004-236381 A | 8/2004 |
| JP | 2005-242441 A | 9/2005 |

(Continued)

OTHER PUBLICATIONS

International Search Report issued in PCT/JP2011/056962 mailed on Jun. 21, 2011 (4 pages).

(Continued)

*Primary Examiner* — Eric Lee
(74) *Attorney, Agent, or Firm* — Osha Liang LLP

(57) ABSTRACT

A charge control device that controls a state of charging to a storage section that stores electric power supplied from a power source and supplies the stored electric power to a load. The charge control device includes a voltage monitoring section which, if the storage section has its inter-terminal voltage being higher than or equal to a predetermined upper limit voltage, determines that the storage section is on a full charge, and which, if the storage section has its inter-terminal voltage being lower than or equal to a predetermined lower limit voltage which is lower than the predetermined upper limit voltage, determines that the storage section needs to be charged.

9 Claims, 5 Drawing Sheets

(56) References Cited

FOREIGN PATENT DOCUMENTS

| | | |
|---|---|---|
| JP | 2008-539561 A | 11/2008 |
| WO | 99/30212 A1 | 6/1999 |

OTHER PUBLICATIONS

Written Opinion of the International Searching Authority issued in PCT/JP2011/056962 mailed on Jun. 21, 2011 (4 pages).

* cited by examiner

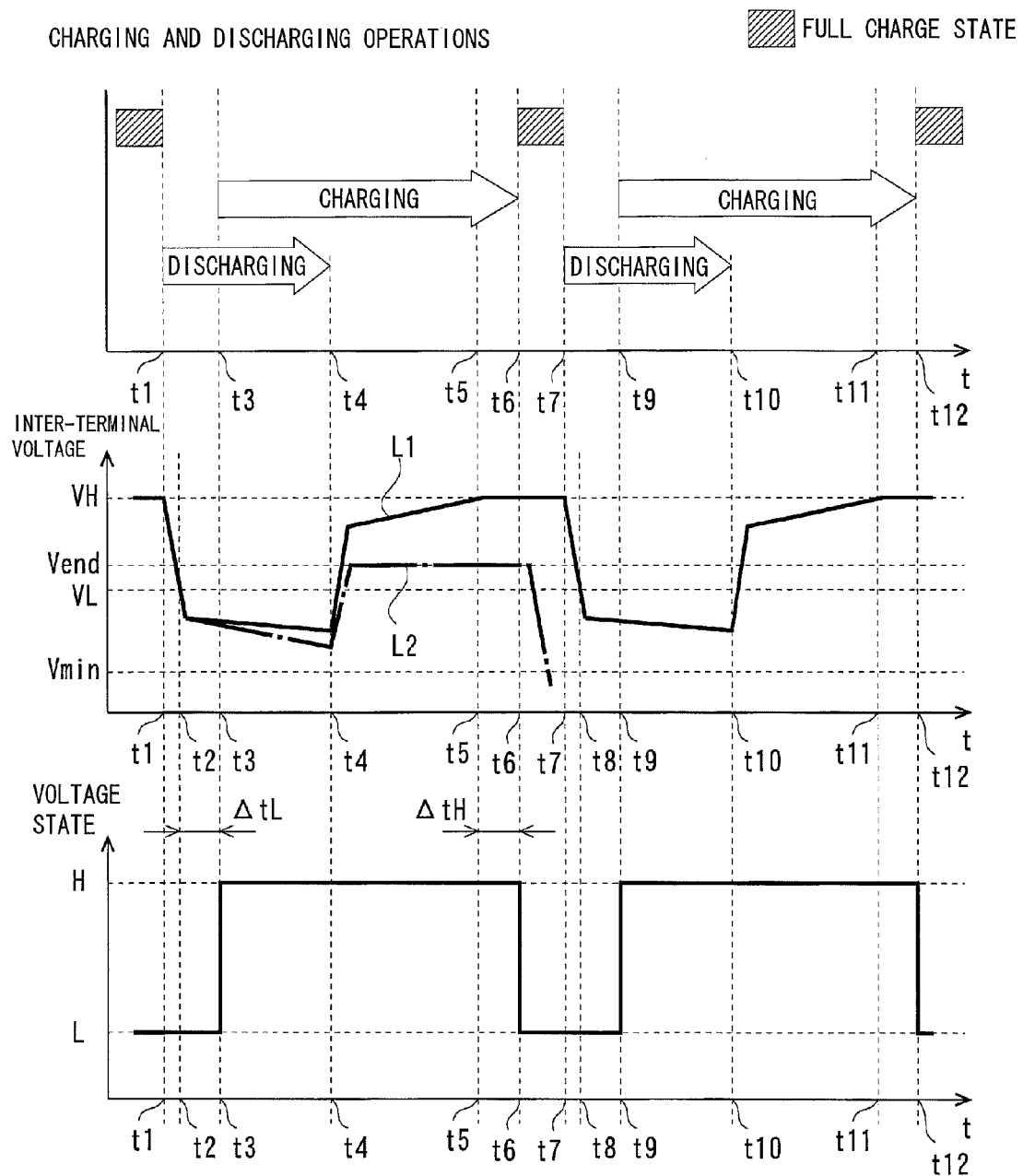

CHARGE CONTROL DEVICE AND DRIVE LOAD MODULE

TECHNICAL FIELD

The present invention relates to a charge control device which controls charging to a storage section which stores electric power for driving a load and supplies the electric power to the load.

BACKGROUND ART

A recent trend of energy saving has drawn attention to environmental energy, which exists naturally and does not depend on fossil fuel etc. Examples of widely known environmental energy include electric power generated from solar power or wind power. Environmental energy also includes vibration energy which usually exists and has as large an energy density as the previous environmental energy examples. By efficiently utilizing such usually-existing energy in driving a load, it is possible to save energy. However, in order to stably drive the load, it is preferable to temporarily store generated electric power and then to use the electric power to drive the load.

For example, there is disclosed a technique of (i) temporarily storing electric power generated by an optical power generation element in a storage element and (ii) using the electric power to drive a watch circuit (see Patent Literature 1). According to the technique, when a voltage stored in the storage element becomes less than a voltage of electric power generated by the optical power generation element, the electric power generated by the optical power generation element starts being stored in the storage element. Furthermore, there is disclosed another technique of controlling, in accordance with a voltage stored in a storage battery, start and stop of charging to the storage battery which is mounted on an automobile equipped with a power generation device, such as an alternator, although it is not the one in the field related to the above-described environmental energy (see Patent Literatures 2 and 3). As described above, according to conventional techniques, regardless of whether or not the techniques are the ones in the filed related to the environmental energy, control of charging to a storage device for driving a load is carried out in accordance with a comparison between a stored voltage and a reference voltage.

CITATION LIST

Patent Literature

Patent Literature 1
International Publication WO99/30212
Patent Literature 2
Japanese Patent Application Publication, Tokukaihei, No. 6-323154 A (1994)
Patent Literature 3
Japanese Patent Application Publication, Tokukai, No. 2004-236381 A

SUMMARY OF INVENTION

Technical Problem

In a case where a load is driven by environmental energy, for stability etc. during driving the load, electric power obtained from the environmental energy is stored in a storage device etc. and the electric power thus stored is used to drive the load. Note however that, since the amount of electric power stored in the storage device is variable, it is necessary to appropriately control a state in which charging is carried out or a state in which charging is not carried out (these states are hereinafter referred to as a "state of charging"). One option to achieve this is to use a timer to carry out charging to the storage device at regular intervals. However, since the timer requires energy when being driven, it is not preferable to use the timer from a viewpoint of the use of energy. Furthermore, a timing of the charging carried out by the timer does not necessarily always suitably match an actual state of charging of the storage device. Therefore, the storage device may be overcharged or a long period of time may be required to charge the storage device.

Furthermore, depending on the size of the load to be driven or the size of the storage device, there may be a case in which electric power consumed by driving the load once is so small that a change in the voltage stored in the storage device is difficult to detect. If this is the case, when the timing of charging is to be determined in accordance with the voltage stored in the storage device, the timing may not always be appropriate. Another option is to reduce the difference between an upper limit voltage (a threshold indicating a full charge state) and a lower limit voltage (a threshold indicating the state in which the storage device needs to be charged) which is set in a detection device, in order to detect a minute change of the voltage. However, in this case, noise caused by a disturbance factor makes a great impact on the detection of minute changes of the voltage. Therefore, not only stable charge control but also stable supply of electric power to the load is not likely to be achieved.

The present invention has been made in view of the above problems, and an object of the present invention is to provide a charge control device which is capable of carrying out, at appropriate timings, control of charging to a storage section that stores electric power, which is generated from environmental energy by a power source, for driving a load.

Solution to Problem

In order to attain the object, the present invention employs a configuration in which a timing of charging to the storage section is controlled by utilizing a voltage drop that occurs in the storage section due to a resistance component and a load current in the storage section when a load is being driven by electric power supplied from the storage section. In a case where the load is driven by environmental energy, a change in a voltage stored in the storage section is not always large enough to be detected (this is described earlier). On the other hand, the voltage drop in the storage section, which occurs when the load is being driven, is large enough to be detected, as compared with the change in the voltage stored in the storage section. This makes it possible to carry out charging at appropriate timings.

Specifically, the present invention is a charge control device which includes: a storage section that stores electric power supplied from a power source and supplies the stored electric power to a load; a voltage monitoring section which, if the storage section has its inter-terminal voltage being higher than or equal to a predetermined upper limit voltage, determines that the storage section is on a full charge, and which, if the storage section has its inter-terminal voltage being lower than or equal to a predetermined lower limit voltage which is lower than the predetermined upper limit voltage, determines that the storage section needs to be charged; a charge control section that controls charging to the storage section in accordance with the inter-terminal voltage of the storage section. The charge control device serves to control a state of charging to the storage section, if the inter-terminal voltage of the storage section becomes less than or equal to the predetermined lower limit voltage due to a voltage drop caused in the storage section due to a resistance component and a load current in the storage section when the load is being driven by the electric power supplied from the storage section and the voltage monitoring section therefore determines that the storage section needs to be charged, the charge control section carrying out charging from the power source to the storage section so that the inter-terminal voltage of the storage section becomes higher than or equal to the predetermined upper limit voltage.

The charge control device in accordance with the present invention is configured such that the load is driven with use of the storage section that stores electric power supplied from the power source which utilizes predetermined environmental energy. In this configuration, the charge control section controls a state of charging of the storage section, that is, a state in which charging is carried out or a state in which charging is not carried out. The "predetermined environmental energy" here is energy obtained from an environmental factor which usually exists around a person skilled in the art. In other words, the "predetermined environmental energy" is energy obtained from an environmental factor which can be easily obtained. Examples of such energy include, but not limited to, solar light, vibration, heat, and electromagnetic waves. The control of charging of the storage section is carried out by the charge control section in accordance with the inter-terminal voltage of the storage section, which is detected and determined by the voltage monitoring section.

Note here that, in the voltage monitoring section, the predetermined upper limit voltage and the predetermined lower limit voltage are set, each of which serves as a reference value with reference to which a state regarding the amount of electric power stored in the storage section is determined. The predetermined upper voltage has a voltage value which is higher than that of the predetermined lower voltage. If the inter-terminal voltage of the storage section is higher than or equal to the predetermined upper limit voltage, the voltage monitoring section determines that the storage section is fully charged with electric power for driving the load. On the other hand, if the inter-terminal voltage of the storage section is lower than or equal to the predetermined lower limit voltage, the voltage monitoring section determines that the storage section is not fully charged with the electric power for driving the load. Therefore, the predetermined upper limit voltage and the predetermined lower limit voltage are each appropriately set in consideration of electric power required to drive the load.

The charge control device in accordance with the present invention focuses on a voltage drop that occurs in the storage section when the load is being driven by the electric power supplied from the storage section, that is, a phenomenon that the inter-terminal voltage of the storage section drops due to, for example, an electric current for driving the load and internal resistance in the storage section. The drop of the inter-terminal voltage of the storage section which occurs while the load is being driven is a phenomenon which occurs as long as the electric current flows while the load is being driven. The drop is also a voltage change which is larger than a change in the inter-terminal voltage of the storage section attributed to energy consumed by the load when the load is driven. In view of this, if the inter-terminal voltage of the storage section becomes lower than or equal to the predetermined lower limit voltage due to the voltage drop, the voltage monitoring section determines that the storage section needs to be charged because the amount of the electric power stored in the storage section is not sufficient. This determination serves as a trigger for starting charging carried out by the charge control section.

That is, if the voltage monitoring section determines, in accordance with the voltage drop, that the storage section needs to be charged, the charge control section carries out the charging from the power source to the storage section. Note, here, that the charging is carried out so that the inter-terminal voltage of the storage section is higher than or equal to the predetermined upper limit voltage which is set to be higher than the predetermined lower limit voltage. This makes it possible to sufficiently charge the storage section with electric power for subsequent load driving.

As described above, according to the charge control device in accordance with the present invention, the voltage monitoring section, in which the predetermined upper limit voltage and the predetermined lower limit voltage are set, monitors a voltage of the storage section. In this situation, a timing of when to charge the storage section is determined by utilizing the voltage drop in the storage section which voltage drop occurs while the load is being driven. This configuration makes it possible, in order to compensate for electric power consumed during the driving of the load, to carry out the charging to the storage section at appropriate timings. Furthermore, since the inter-terminal voltage of the storage section becomes higher than or equal to the predetermined upper limit voltage after the charging, stable driving of the load is expected. It is preferable that the inter-terminal voltage of the storage section is kept higher than or equal to a predetermined drive voltage necessary for stably driving the load while the load is carrying out the predetermined operation.

Another aspect of the present invention is a method for controlling a state of charging to a storage section. Specifically, the present invention is a charge control method for controlling a state of charging to a storage section that stores electric power supplied from a power source and supplies the stored electric power to a load, the state of charging being controlled in accordance with a criterion of determination by which, if the storage section has its inter-terminal voltage being higher than or equal to a predetermined upper limit voltage, it is determined that the storage section is on a full charge, and by which, if the storage section has its inter-terminal voltage being lower than or equal to a predetermined lower limit voltage which is lower than the predetermined upper limit voltage, it is determined that the storage section needs to be charged, the charge control method includes the steps of: detecting whether the inter-terminal voltage of the storage section becomes less than or equal to the predetermined lower limit voltage due to a voltage drop caused in the storage section due to a resistance component and a load current in the storage section when the load is being driven by the electric power supplied from the storage section; and if the inter-terminal voltage of the storage section becomes less than or equal to the predetermined lower limit voltage, causing the power source to charge the storage section so that the inter-terminal voltage of the storage section becomes higher than or equal to the predetermined upper limit voltage. Note that the above-mentioned technical ideas related to the charge control device and the drive load module are also applicable to the invention directed to a method for controlling the state of charging to the storage section.

Advantageous Effects of Invention

The present invention makes it possible to provide a charge control device which is capable of carrying out, at appropriate timings, control of charging to a storage section that stores electric power, which is generated from environmental energy by a power source, for driving a load.

BRIEF DESCRIPTION OF DRAWINGS

FIG. 2A illustrates changes of predetermined parameters regarding charging to and discharging from the storage device in the wireless communication module illustrated in FIG. 1.

DESCRIPTION OF EMBODIMENTS

The following description will discuss, with reference to the drawings, a wireless communication module 1 in accordance with an embodiment of the present invention and a control device 2 included in the wireless communication module 1. Note that a configuration of the following embodiment is an example, and the present invention is not limited to the configuration of this embodiment.

Figure 1:
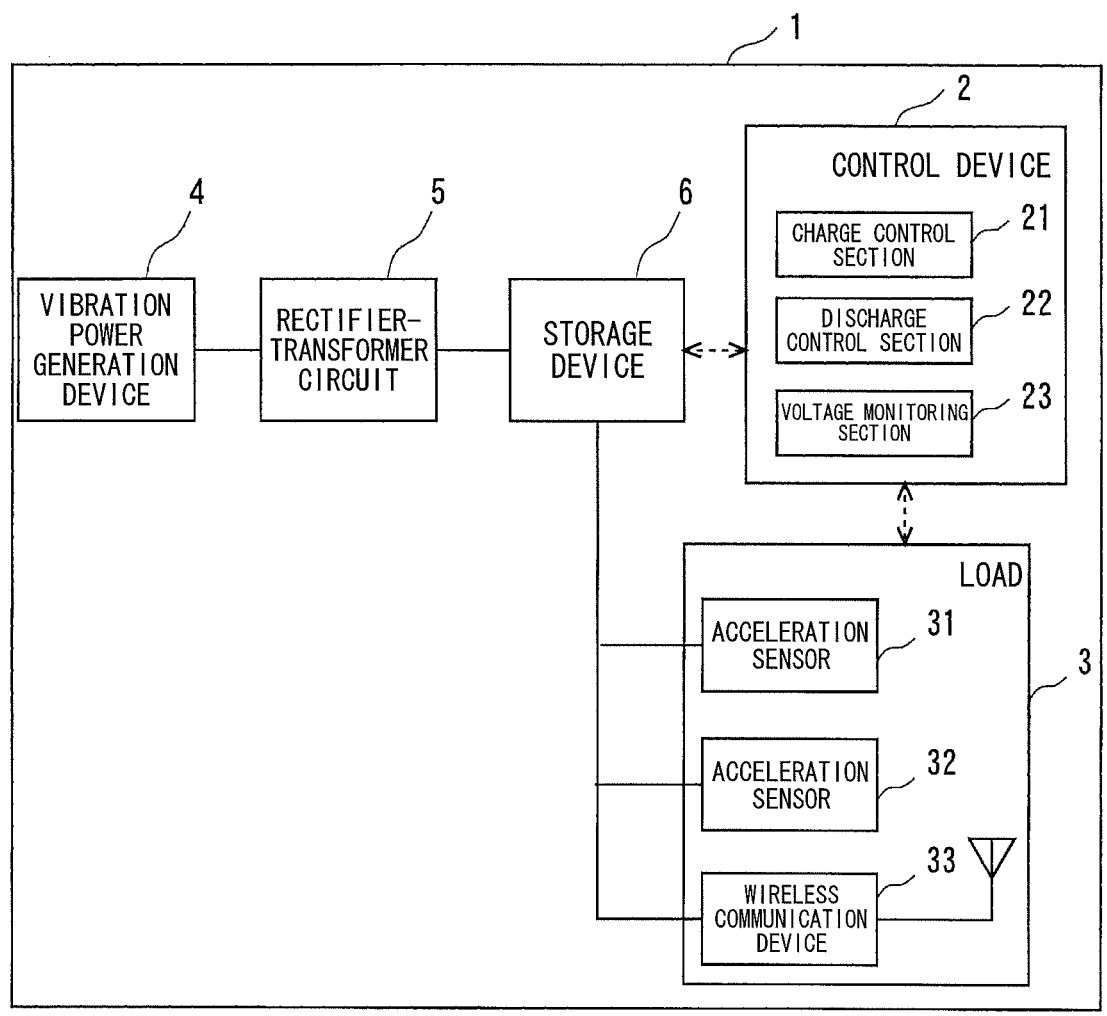
FIG. 1 schematically illustrates a configuration of a wireless communication module including a control device corresponding to a charge control device of the present invention.
Figure 1:
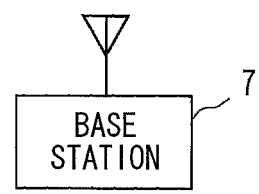

The wireless communication module 1 illustrated in FIG. 1 includes (i) a load 3 including a plurality of load elements, (ii) a vibration power generation device 4 generating driving electric power to drive the load 3, (iii) a storage device 6 for storing generated electric power and (iv) a rectifier-transformer circuit 5, which is provided between the vibration power generation device 4 and the storage device 6, for rectifying an electric current generated by the vibration power generation device 4, transforming a voltage corresponding to the rectified electric current, and applying the transformed voltage to the storage device 6. Note, here, that the vibration power generation device 4 is a power source which generates power from so-called environmental energy, and an example of the vibration power generation device 4 is a power generation device including an electret material. Since the vibration power generation device itself is a known technique, it is not described in detail in this specification. Note that, although the present example employs a vibration power generation device including an electret material which generates electric power of 20 µW to 100 µW and whose output voltage is 30 Vp-p to 80 Vp-p, the present invention is not limited to such a vibration power generation device.

In addition to or instead of the vibration power generation device, other power generation device(s) other than the vibration power generation device may be used, such as a solar power generation device, a thermal power generation device, an electromagnetic induction power generation (CT power generation) device, and/or a biological power generation device. These devices are also known techniques, and therefore are not described in detail in this specification. Furthermore, the rectifier-transformer circuit is also a known technique, and therefore is not described in detail here.

The storage device 6 can be any storage device, provided that the storage device is capable of storing electric power generated by the vibration power generation device 4 and supplying the electric power required for driving the load 3. The storage device 6 can be, for example, an electric double-layer capacitor or other kind of secondary battery. In the configuration illustrated in FIG. 1, the load 3 includes (i) two acceleration sensors 31 and 32 and (ii) a wireless communication device 33 which transmits, to a base station 7 outside the wireless communication module 1 by wireless, values detected by the acceleration sensors 31 and 32. How the wireless communication device 33 carries out communication is not particularly limited. Note, however, that it is preferable to employ, for example, a low-power-consuming communication method which is in compliance with the ZigBee standard. The acceleration sensors 31 and 32 are devices that detect accelerations along respective predetermined directions in a position where the wireless communication module 1 is provided. Since this is also a known technique, detailed descriptions thereof are omitted in this specification.

The wireless communication module 1 thus configured (i) integrally includes the vibration power generation device 4, the acceleration sensors 31 and 32 each of which serves as a load element for obtaining information, and the wireless communication device 33 which serves as another load element, and (ii) is configured to transmit obtained information to an external device by wireless. Namely, the wireless communication module 1 serves as a stand-alone information-gathering device. Therefore, where to provide the wireless communication module 1 is not particularly limited, and therefore it is possible to provide the wireless communication module 1 in any position as appropriate and easily gather information via the base station 7 in an area where the wireless communication module 1 is provided. As such, the wireless communication module 1 is a module having a very useful function. Note however that, in order to cause the load 3 (which is constituted by a plurality of load elements and mounted on the wireless communication module 1) to operate constantly without problems, it is necessary that electric power, which is required to drive the plurality of load elements, keep being supplied appropriately. To this end, the wireless communication module 1 of the present invention includes the control device 2, which carries out control related to a state of charging to the storage section 6 which supplies electric power to the load 3. This control ensures good driving of the load 3. The following specifically discusses the control related to the state of charging.

As illustrated in FIG. 1, the control device 2 includes functional sections, i.e., a charge control section 21, a discharge control section 22, and a voltage monitoring section 23. These functional sections are images of functions of the control device 2, which functions are related to control of the state of charging to the storage device 6. These functions may be realized by corresponding control circuits provided in the control device 2. Alternatively, in a case where the control device 2 is a computer, the functions may be realized by a control program executed on the computer. Alternatively, the functions may be realized by the control circuits and the control program operating together. It is needless to say that the control device 2 may include a functional section(s) other than the function sections illustrated in FIG. 1.

The charge control section 21 is a functional section which governs control related to charging to the storage device 6. In order to drive the load 3 always constantly, it is necessary to keep an inter-terminal voltage of the storage section 6 higher than or equal to the minimum drive voltage that is necessary to ensure the driving of the load. In view of this, in order to stably drive the load 3, the charge control section 21 controls charging from the vibration power generation device 4 (a power source) to the storage device 6. On the other hand, the discharge control section 22 carries out control, for driving the load 3, related to discharging of electric power from the storage device 6. The voltage monitoring section 23 is a functional section which, in order that the charge control by the charge control section 21 and the discharge control by the discharge control section 22 are carried out at appropriate timings, monitors the state of charging (e.g., inter-terminal voltage) of the storage device 6. Since the control device 2 includes the charge control section 21 and the voltage monitoring section 23 as above, the control section 2 corresponds to a charge control device of the present invention. Note that, although these functional sections are separated as illustrated in FIG. 1 for convenience of description, these functional sections can be integrated or subdivided in an actual configuration provided that the above-mentioned functions are achieved.

FIG. 2A illustrates timing charts of control related to the state of charging to the storage device 6, which control is carried out by the voltage monitoring section 23 and the charge control section 21. Details of FIG. 2A are as follows. The upper part of FIG. 2A illustrates a timing chart schematically showing when to carry out charging to and discharging from the storage device 6. The middle part of FIG. 2A illustrates a timing chart showing changes of the inter-terminal voltage of the storage section 6. The lower part of FIG. 2A illustrates a timing chart showing changes of a voltage state of the storage section 6 determined by the voltage monitoring section 23. The timing charts in FIG. 2A are arranged such that they share a common time axis, and twelve points in time are marked as t1 to t12.

In the timing chart related to charging and discharging operations (the timing chart in the upper part), there are arrows corresponding to a period during which changing to the storage device is carried out and a period during which discharging from the storage device 6 is carried out. Furthermore, a period during which the storage device 6 is on a full charge, that is, a period during which the storage section 6 stores electric power high enough to drive the load 3, is represented by a corresponding strip-shaped rectangle. In the timing chart showing the changes of the inter-terminal voltage of the storage device 6 (the timing chart in the middle part), (i) solid line L1 represents changes of a voltage occurring when the state of charging to the storage device 6 is controlled by the control device 2 of the present invention and (ii) dot-dash line L2 represents changes of a voltage occurring when the state of charging is controlled by a conventional technique (comparative example).

In the timing chart showing the changes of the voltage state of the storage device 6 (the timing chart in the lower part), a high level signal (H signal) and a low level signal (L signal) are illustrated. The H signal and the L signal are obtained in the following manner. The voltage monitoring section 23 detects the inter-terminal voltage and determines whether the inter-terminal voltage thus detected is low or high, and outputs a result of the determination as the H signal or the L signal. Specifically, the voltage monitoring section 23 is constituted by a voltage monitor IC chip. In the voltage monitor chip IC, an upper limit monitor voltage VH and a lower limit monitor voltage VL are set. The upper limit monitor voltage VH and the lower limit monitor voltage VL are related such that the upper limit monitor voltage VH is higher than the lower limit monitor voltage VL. When the inter-terminal voltage of the storage device 6 has increased from a low voltage to a voltage higher than or equal to the upper limit monitor voltage VH, an output of the voltage monitoring section 23 is changed from the H signal to the L signal. On the other hand, when the inter-terminal voltage of the storage device 6 decreased from a high voltage to a voltage less than or equal to the lower limit monitor voltage VL, the output of the voltage monitoring section 23 is changed from the L signal to the H signal. As described above, the voltage state determined by the voltage monitoring section 23 switches between high and low at a threshold that differs depending on the direction of voltage change. That is, the voltage states (high and low) are switched at thresholds with hysteresis. The amount of the hysteresis, that is, a difference between the upper limit monitor voltage VH and the lower limit monitor voltage VL, is discussed later.

Figure 2B:
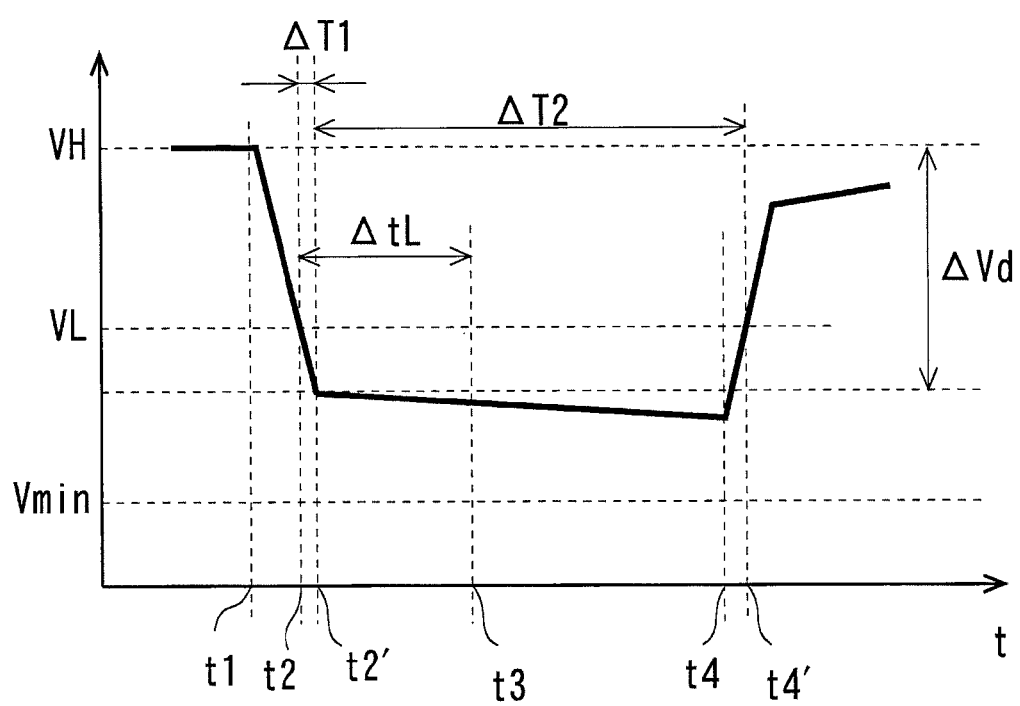
FIG. 2B illustrates details of changes of a voltage stored in the storage device illustrated in FIG. 2A.

On the basis of the above arrangements, the following successively discusses, for each period illustrated in FIG. 2A, the control related to the state of charging to the storage device 6, which control is carried out by the control device 2. In the following description, it is assumed that, before a time t1, the storage device 6 is on a full charge and the output of the voltage monitoring section 23 is the L signal. FIG. 2B shows an enlarged view illustrating the changes of the inter-terminal voltage around a period from t1 to t4. In FIG. 2B, times t2' and t4', which are not illustrated in FIG. 2A, are described, and these are also discussed in the following description.

(1) Period Before Time t1 and Period from t1 to t2

In a period before the time t1, the load 3 is not driven and the storage device 6 is on a full charge. Therefore, the inter-terminal voltage of the storage device 6 has a maximum voltage value which is equal to the upper limit monitor voltage VH. Note that, in this period, the voltage monitoring section is outputting the L signal. At the time t1, the storage device 6 starts supplying (discharging) electric power to the load 3, and a drive electric current required to drive the acceleration sensors 31 and 32 and the wireless communication device 33 (which are constituents of the load 3) starts flowing from the storage device 6. Since the storage device 6 has some level of internal resistance, the inter-terminal voltage of the storage device 6 sharply drops when the electric current sharply increases at the start of driving of the load. In this specification, the drop of the inter-terminal voltage of the storage device 6 which occurs due to the drive electric current which starts flowing when the load 3 starts being driven is referred to as a "driving-time voltage drop". Note that the driving-time voltage drop occurs over a period from the time t1 to a time t2' (this will be described later), and, at the time t2 between the time t1 and the time t2', the inter-terminal voltage becomes lower than the lower limit monitor voltage VL. Note that, during the period from t1 to t2, the voltage monitoring section 23 is outputting the L signal.

(2) Period from t2 to t3

During a period from t2 to t3, the storage section 6 keeps supplying electric power to the load 3 so that the load 3 keeps being driven. Therefore, even after the driving-time voltage drop has finished at the time 2' between the time t2 and the time t3, that is, even after completion of the sharp rising of drive electric current at the start of driving of the load, the inter-terminal voltage of the storage device 6 decreases as time passes, although the decrease is gentle as compared to the driving-time voltage drop. The period from t2 to t3 corresponds to a predetermined first period ΔtL, which starts from the time t2 at which the inter-terminal voltage has become lower than the lower limit monitor voltage VL as described above. The predetermined first period ΔtL is a threshold with reference to which the voltage monitoring section 23 detects a state where the inter-terminal voltage is less than or equal to the lower limit monitor voltage VL. In a case where the inter-terminal voltage remains lower than or equal to the lower limit monitor voltage VL for the predetermined first period ΔtL or longer, that is, when the time t3 is reached, the output of the voltage monitoring section 23 is switched from the L signal to the H signal.

(3) Period from t3 to t4

After the time t3, the storage device 6 keeps supplying electric power to the load 3 so that the load 3 keeps being driven. When a time t4 is reached, the load 3 stops being driven. Therefore, discharging from the storage device 6 stops at the time t4, and this means that the drop of the inter-terminal voltage finishes at the time t4. In the period from t2 to t3, the output of the voltage monitoring section 23 is switched from the L signal to the H signal. Therefore, at or after the time t3, charging from the vibration power generation device 4 to the storage device 6 is started. Therefore, the drop of the inter-terminal voltage of the storage section 6 becomes gentle to some degree. That the charging to the storage device 6 is started at the time t3 when the inter-terminal voltage of the storage device 6, which inter-terminal voltage has dropped due to the driving of the load 3, has remained lower than the lower limit monitor voltage VL for the predetermined period ΔtL or longer. Note that the charging to the storage device 6 keeps being carried out over a period during which the voltage monitoring section 23 is outputting the H signal.

(4) Period from t4 to t5

As described above, the driving of the load 3 is stopped at the time t4. Accordingly, the drive electric current required to drive the load 3 stops flowing from the storage device 6 to the load 3. Therefore, after the time t4, the inter-terminal voltage rises to compensate for the driving-time voltage drop occurred over the period from t1 to t2'. While the inter-terminal voltage is rising, it becomes higher than the lower limit monitor voltage VL at the time t4' between t4 and t5. However, this does not change the output of the voltage monitoring section 23. Note that electric power stored in the storage device 6 has been consumed over the period from t1 to t4 because the load 3 has been driven during the period. Therefore, even after the rise of the inter-terminal voltage of the storage device 6, the inter-terminal voltage does not reach the upper limit monitor voltage VH. In view of the circumstances, the inter-terminal voltage is increased by the charging from the vibration power generation device 4, which charging has been carried out since the time t3. As a result, the inter-terminal voltage reaches the upper limit monitor voltage VH at the time t5. Note however that, even at this time, the output of the voltage monitoring section 23 is still the H signal.

(5) Period from t5 from t6

As described above, the charging from the vibration power generation device 4 to the storage device 6 is being carried out even at the time t5, and the inter-terminal voltage at the time t5 is the upper limit monitor voltage VH. The period from t5 to t6 corresponds to a predetermined second period ΔtH, which starts from the time when the inter-terminal voltage has reached the upper limit monitor voltage VH at the time t5. The predetermined second period ΔtH is a threshold with reference to which the voltage monitoring section 23 detects a state where the inter-terminal voltage is higher than or equal to the upper limit monitor voltage VH. In a case where the inter-terminal voltage remains higher than or equal to the upper limit monitor voltage VH for the predetermined second period ΔtH or longer, that is, when the time t6 is reached, the output of the voltage monitoring section 23 is switched from the H signal to the L signal. The charging from the vibration power generation device 4 to the storage device 6 finishes upon the change of the output of the voltage monitoring section 23.

Period from t6 to t7 and Subsequent Period from t7 to t12

A period from t6 to t7 is a waiting period during which the load is not driven until next driving is started in the wireless communication module 1. That is, during the waiting period, the electric power stored in the storage device 6 is not consumed, and thus the storage device 6 remains on a full charge. Note that the next driving of the load may be started after a predetermined time has passed. Alternatively, the next driving of the load may be started in response to an instruction from outside the module or in accordance with a determination by the module. Note, here, that a period from t7 to t12 corresponds to a period in which the next driving of the load is carried out. The times t7 to t12 correspond to the above-described times t1 to t6, respectively. Therefore, detailed descriptions of the times are omitted here.

As has been described, according to the wireless communication module 1 of the present invention, the timing of when to charge the storage device 6 is controlled in accordance with a result of monitoring of voltages by the voltage monitoring section 23, in which two voltage thresholds with hysteresis, i.e., the lower limit monitor voltage VL and the upper limit monitor voltage VH, are set. In other words, the wireless communication module 1 is configured such that (i) a threshold for the start of charging and a threshold for the stop of the charging are set so as to be different from each other and (ii) the charging of the storage device 6 is started when the inter-terminal voltage of the storage device 6 has become lower than the threshold (the lower limit monitor voltage VL) due to the driving-time voltage drop which occurs over a period during which the load 3 is driven.

In a case where only a small amount of electric power is required to drive the load 3, a difference between the inter-terminal voltage of the storage device 6 before the driving and the inter-terminal voltage after the driving may be not so large. In particular, since each load element mounted on the wireless communication module 1 has been reduced in size for better convenience of the wireless communication module 1 in recent years, energy required to cause a load to operate once is very small. For example, assume in the example illustrated in FIG. 2A that the upper limit monitor voltage is 3.57 V, the lower limit monitor voltage is 3.4 V, capacity of the storage device 6 is 0.033 F, drive energy ΔE required for a series of operations of the load 3 (operations of the above-described acceleration sensors 31 and 32 and the wireless communication device 33) is 0.002 J. In this case, the inter-terminal voltage Vend at the time when the load stops being driven is 3.55 V. Changes of the inter-terminal voltage of the storage device 6 observed here are represented by the dot-dash line L2 in the middle part of FIG. 2A. In this case, the difference between voltages before and after the load is driven is only 0.02 V. Taking into account effects of errors and noise in voltage detection, it is not easy to accurately detect the difference as small as 0.02 V.

Meanwhile, in a process of driving the load 3, it is necessary that a drive voltage supplied to the load 3 be always higher than a drive voltage Vmin (see FIGS. 2A and 2B) that is required to ensure driving of the load 3. Note however that, if the storage device 6 is not charged after the driving of the load 3 and thereafter the load 3 is driven again, the inter-terminal voltage of the storage device 6 becomes lower than the drive voltage Vmin due to the driving-time voltage drop which occurs when the load 3 starts being driven again (see dot-dash line L2 in FIG. 2A). As a result, stable driving of the load 3 may not be maintained.

In this regard, since the wireless communication module 1 of the present invention has the above configuration regarding the charging, it is possible to detect, in accordance with a state of the inter-terminal voltage affected by the driving-time voltage drop, consumption of the electric power stored in the storage capacitor 6 which electric power is consumed for driving the load 3. In other words, it is possible to detect a state in which the storage capacitor 6 needs to be charged. Accordingly, as shown by the solid line L1 in FIG. 2A, in the process of driving the load 3, it is possible to ensure that the inter-terminal voltage of the storage device 6 does not become lower than the drive voltage Vmin. In particular, in a case where driving of the load 3 is repeated continuously, it is very important to determine when to charge the storage device 6, in order to achieve steady driving of the load 3.

Note, here, that it is preferable that a difference (difference VH−VL) between the inter-terminal voltage VH of the fully-charged storage device 6 and the threshold voltage VL which serves as a trigger for starting charging is determined so that the following expression 1 is satisfied.

$$VH-VL<Vd-\Delta Vn \quad \text{(Expression 1)}$$

Vd: Driving-time voltage drop

ΔVn: Margin for voltage change due to noise etc.

In a case where the difference VH−VL is set like above, a trigger for starting the charging of the storage device 6 is generated each time the load 3 carries out a series of operations (the above-described operations of driving the acceleration sensors 31 and 32 and the wireless communication device 33) (see FIG. 2A). This means that the storage device 6 is on a full charge whenever the load starts being driven. This makes it possible to ensure a stable, continuous operation of the wireless communication module 1.

Furthermore, the above embodiment employs a configuration in which the voltage monitoring section 23 monitors the state of the inter-terminal voltage of the storage device 6 while carrying out switching between the H and L signals in the following manner: a signal indicative of a voltage state is switched between the H signal and the L signal not immediately after the inter-terminal voltage becomes the lower limit monitor voltage VL or lower or the inter-terminal voltage becomes the upper limit monitor voltage VH or higher but after the predetermined first period ΔtL or the predetermined second period ΔtH has passed. Since the signal indicative of the voltage state is to be changed when the inter-terminal voltage remains at the lower limit monitor voltage LV or lower or at the upper limit monitor voltage VH or higher for a predetermined period of time like above, it is possible to avoid a situation in which charging is started or stopped unnecessarily when the inter-terminal voltage momentarily becomes unstable due to a disturbance factor such as noise. Therefore, it is possible to ensure stable control of charging of the storage device 6, and thereby ensure stable driving of the load 3.

Note that it is preferable that the predetermined first period ΔtL is determined so that the following expression 2 is satisfied:

$$\Delta tL<\Delta T1+\Delta T2 \quad \text{(Expression 2)}$$

ΔT1: Period from time t2 (at which the inter-terminal voltage becomes lower than the lower limit monitor voltage VL due to the driving-time voltage drop) to time t2' (at which the driving-time voltage drop finishes)

ΔT2: Period from time t2' to time t4' (at which the inter-terminal voltage, which sharply increased, becomes higher than the lower limit monitor voltage VL due to dissolution of the driving-time voltage drop due to stopping of driving the load)

By setting the predetermined first period ΔtL like above, it is possible to ensure stable driving of the load 3 while eliminating effects of the disturbance factor such as noise as described above. On the other hand, it is preferable that a maximum value of the predetermined second period ΔtH is set such that continuous operation of the load 3 is not disturbed, that is, such that the period from t5 to t7 shown in FIG. 2A does not become too long. In consideration of the above, the predetermined first period ΔtL and the predetermined second period ΔtH can be each set, for example, to approximately 30 microseconds.

Modified Example 1

Figure 3:
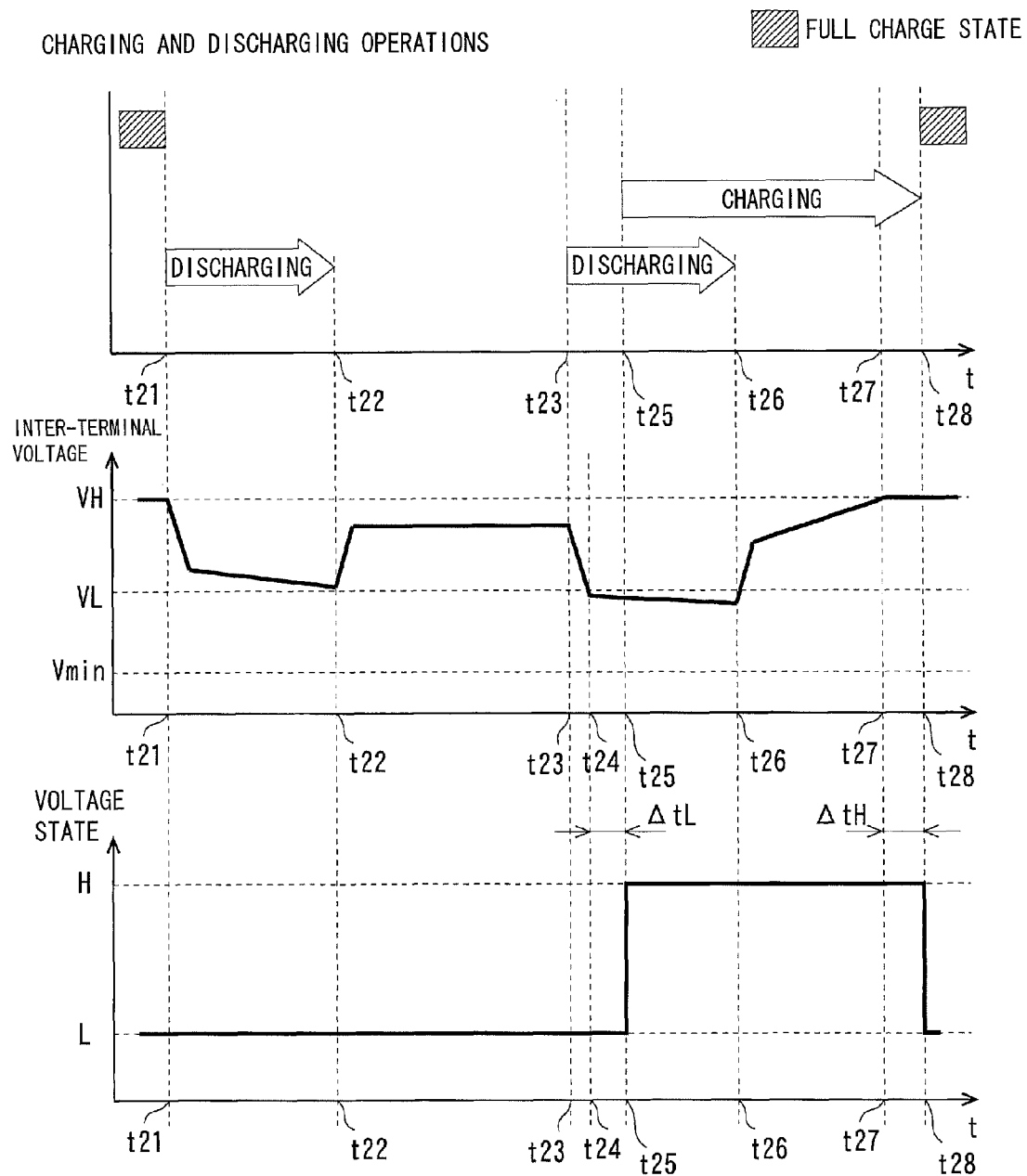
FIG. 3 illustrates predetermined parameters, in accordance with another example, regarding charging to and discharging from a storage device in the wireless communication module illustrated in FIG. 1.

FIG. 3 illustrates a modified example of control of charging of the storage device 6, which control is carried out by the control device 2 included in the wireless communication module 1 of the present invention. In the example illustrated in FIG. 3, unlike the example illustrated in FIG. 2A, the control of charging of the storage device 6 is carried out after the load 3 carries out a plurality of operations (two operations in this example). The following roughly discusses the control of charging. It is assumed in the present modified example that the amount of electric power required to drive the load 3 once is smaller than that required in the example illustrated in FIG. 2A. This is realized by, for example, reducing the number of acceleration sensors to be driven to one (1).

(1) Period from t21 to t22

In a period from t21 to t22, a first driving of the load 3 is carried out. In this period, the inter-terminal voltage of the storage device 6 does not become lower than or equal to the lower limit monitor voltage VL even when the driving-time voltage drop is occurring.

(2) Period from t22 to t23

In a period from t22 to t23, driving of the load is stopped. However, since the inter-terminal voltage does not become lower than or equal to the lower limit monitor voltage VL like above, charging from the vibration power generation device 4 is not carried out. Accordingly, during this period, the inter-terminal voltage remains at a voltage which is obtained after the driving-time voltage drop has been dissolved.

Note that, during the above periods, the output of the voltage monitoring section 23 remains as the L signal, because the inter-terminal voltage does not become lower than or equal to the lower limit monitor voltage VL for the predetermined first period ΔtL.

(3) Period from t23 to t24

At a time t23, second driving of the load 3 is started. Accordingly, after the time t23, the inter-terminal voltage significantly decreases due to the driving-time voltage drop, and, at a time t24, becomes lower than or equal to the lower limit monitor voltage VL.

(4) Period from t24 to t25

The period from t24 to t25 corresponds to the predetermined first period $\Delta tL$, which starts from the time t24. During the period, the inter-terminal voltage remains lower than the lower limit monitor voltage VL. Accordingly, when a time t25 is reached, the output of the voltage monitoring section 23 is switched from the L signal to the H signal. This means that a trigger for starting charging of the storage device 6 is generated.

(5) Period from t25 to t26

During this period, the charging of the storage device 6 continues, and, at a time t26, the driving of the load 3 is stopped.

(6) Period from t26 to t27

As described above, the driving of the load 3 is stopped at the time t26. Therefore, in this period, the driving-time voltage drop is dissolved. Accordingly, the inter-terminal voltage sharply increases, and the charging of the storage device 6 further continues. Then, at a time t27, the inter-terminal voltage reaches the upper limit monitor voltage VH.

(7) Period from t27 to t28

This period corresponds to the predetermined second period $\Delta tH$, which starts from the timing t27. In the beginning of this period, the inter-terminal voltage is the upper limit monitor voltage VH. When a time t28 is reached, the output of the voltage monitoring section 23 is switched from the H signal to the L signal. This means that a trigger for stopping the charging of the storage device 6 is generated.

As described above, it is also possible to employ a configuration in which the control of charging of the storage device 6 is started in accordance with the driving-time voltage drop after the driving of the load 3 has carried out a plurality of times. Note however that, in this case, the range of variation of the inter-terminal voltage for each driving is relatively small. Therefore, it is necessary that the inter-terminal voltage do not become lower than an operation voltage Vmin while the operation is carried out a plurality of times. Furthermore, according to the configuration of this modified example, electric power consumed in driving the load twice is supplied by carrying out the charge control (charge control over the period from t25 to t28) only once. Therefore, it may take a longer period of time to fully charge the storage device 6 than the case where the charge control is carried out each time the load is driven. In view of this, in order to reduce the effects on a desired pattern of load driving as much as possible, it is preferable to control a value of VL so that the charge control is carried out each time the load 3 is operated (as illustrated in FIG. 2A).

Modified Example 2

Figure 4:
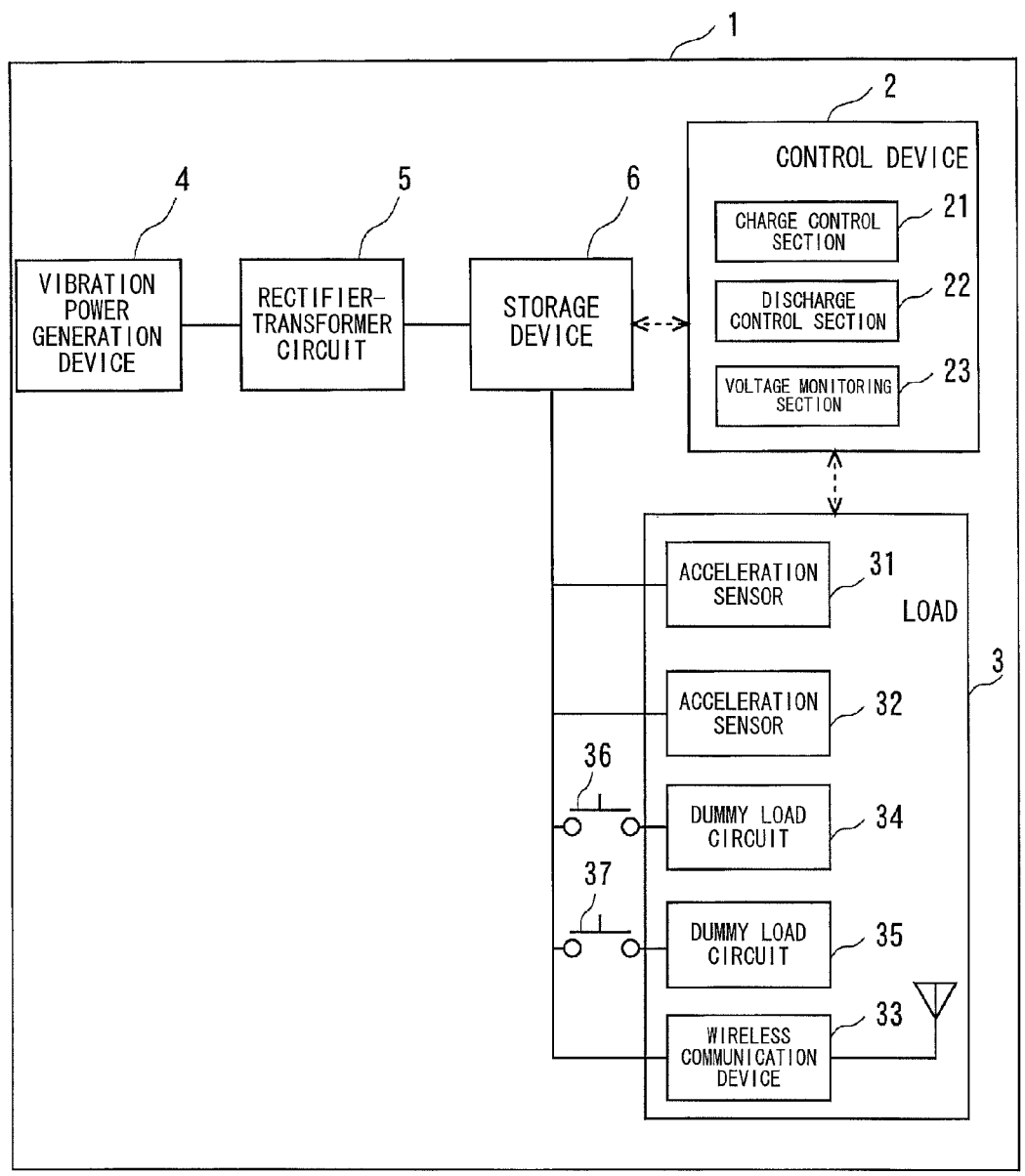
FIG. 4 schematically illustrates a configuration of a wireless communication module in accordance with another example which includes a control device corresponding to the charge control device of the present invention.
Figure 4:
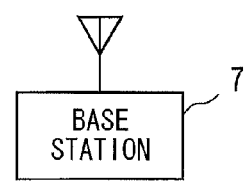

FIG. 4 illustrates another modified example of the wireless communication module 1 of the present invention. The example illustrated in FIG. 4 is different from the example illustrated in FIG. 1 in that the load 3 includes dummy load circuits 34 and 35 in addition to the acceleration sensors 31 and 32 and the wireless communication device 33. Each of the dummy circuits 34 and 35 is, unlike the acceleration sensors 31 etc., not a functional load element which for example obtains specific data and transmits the data to an external device by wireless. Each of the dummy circuits 34 and 35 is a load element which serves as an electric power consumption circuit for consuming electric power supplied from the storage device 6. The dummy load circuit 34 consumes a smaller amount of electric power than the dummy load circuit 35. The dummy load circuits 34 and 35 are connected to and disconnected from the storage device 6 by switches 36 and 37, respectively, so that electric power is supplied from the storage device 6 to the dummy load circuits 34 and 35 by turning ON the switches 36 and 37 and the supply of the electric power is stopped by turning OFF the switches 36 and 37.

According to the wireless communication module 1 configured like above, even in a case where the amount of electric power required to drive the load 3 is small and, in particular, the driving-time voltage drop is small, it is possible to unfailingly control when to start charging of the storage device 6. For example, in the case where the driving-time voltage drop while the load 3 is driven is small (e.g., in the case where only the acceleration sensor 31 is driven as illustrated in FIG. 3), the charge control of the storage device 6 is not started after the load is driven once, because the inter-terminal voltage of the storage device 6 does not become lower than or equal to the lower limit monitor voltage VL after the load is driven once. In this regard, according to this modified example, by supplying electric power to the dummy load circuit 34 while the acceleration sensor 31 is being driven, it is possible to increase electric power required to drive the entire load 3 so that the driving-time voltage drop increases. Accordingly, even in a case where a small load element is to be driven, it is possible to charge the storage device 6 at an appropriate timing for each driving. Such an electric power supply to the dummy load circuit 34 corresponds to a forced operation of the load of the present invention.

Another example of the forced operation of the load is to drive only the dummy load circuit 35 before driving the load 3 in order to ensure that the storage device 6 is fully charged. In this case, for further ensuring that the load 3 operates stably for some reasons, electric power is supplied to the dummy load circuit 35 immediately before the load 3 is driven. The dummy load circuit 35 is a load element which causes, because of its ability of consuming electric power, a driving-time voltage drop to occur that is large enough to generate a trigger for starting the control of charging of the storage device 6. Since such a dummy load circuit 35 is provided, it is possible, even in a case where the load 3 carries out an operation which requires relatively large electric power, to fully charge the storage device 6 in advance. This makes it possible to ensure a stable operation of the load.

Example

The following description will discuss an example of the control device 2 and the wireless communication module 1 in accordance with the present invention.

Upper limit monitor voltage VH: 3.57 V
Lower limit monitor voltage VL: 3.4 V
Internal resistance of the storage device 6: 50Ω

In addition, a load element(s) (such as an acceleration sensor) in the load 3 is/are selected so that an electric current flowing when the load 3 is driven is 10 mA. In this arrangement, the driving-time voltage drop is 0.5 V, and the inter-terminal voltage of the storage device 6 after the voltage drop is 3.07 V. Therefore, it is possible to achieve stable driving of the load 3 even if the inter-terminal voltage fluctuates due to disturbance.

Note that, if a driving current is too small, it is not possible to cause a sufficient driving-time voltage drop. In view of this, a minimum value of the driving current is set to (3.57−3.4)/50=3.4 mA (for convenience, voltage changes due to disturbance are not taken into account). On the other hand, if the driving current is too large, the inter-terminal voltage becomes lower than a drive voltage Vmin for the load 3. This is not preferable. Therefore, assuming that the drive voltage Vmin is 2.0 V, a maximum value of the driving current is (3.57−2.0)/50=31.4 mA.

Concrete examples of the load elements constituting the load 3 are as follows. Specifically, Table 1 shows two examples of the wireless communication device, and Table 2 shows six examples of sensors including an acceleration sensor. The sum total of the driving-time voltage drop which occurs due to the load elements appears as the amount of voltage drop for the entire load 3, and leads to generation of a trigger for starting the control of charging of the storage sensor 6. That is, it is only necessary to set the upper limit monitor voltage VH and the lower limit monitor voltage VL in the control device 2 in consideration of the type and number of wireless communication devices to be used and the type and number of sensors to be used.

TABLE 1

| Type of wireless communication device | Operation example (drive electric current × driving time) | Driving-time voltage drop when internal resistance is 50 Ω |
|---|---|---|
| ZigBee | 50 mA × 50 to 100 msec | Approximately 2.5 V |
| Gazell (registered trademark) | 10 to 20 mA × 20 to 40 msec | Approximately 0.5 V to 1 V |

TABLE 2

| Type of sensor | Operation example (drive electric current × driving time) | Driving-time voltage drop when internal resistance is 50 Ω |
|---|---|---|
| Temperature-humidity sensor | 0.1 mA × 100 msec | Approximately 5 mV |
| Light intensity sensor | 3 to 300 µA × 100 msec | Approximately 0.15 mV to 15 mV |
| Flow sensor | 10 to 20 mA × 100 msec | Approximately 500 mV to 1000 mV |
| Acceleration sensor | 0.1 to 0.2 mA × 200 msec | Approximately 5 mV to 10 mV |
| Pressure sensor | 1 mA × 100 msec | Approximately 50 mV |
| Infrared sensor | 1 to 2 mA × 100 msec | Approximately 50 mV to 100 mV |

Note that the above-described load elements are examples, and other various load elements can also be included in the module in accordance with the present invention.

The present invention can also be configured as below.

The charge control device can be configured such that, in a case where the load carries out a predetermined operation composed of a single action or plural actions when supplied with the electric power from the storage section; and a difference between the predetermined upper limit voltage and the predetermined lower limit voltage is set so that the inter-terminal voltage of the storage section changes from the predetermined upper limit voltage to the predetermined lower limit voltage or lower due to a voltage drop caused in the storage section while the load is carrying out the predetermined operation. That is, by setting the difference between the predetermined upper limit voltage and the predetermined lower limit voltage in accordance with the predetermined operation of the load, the charge control section is caused to carry out charging to the storage section each time the load carries out the predetermined operation. Therefore, it is possible to cause, at appropriate timings, the storage section to store the electric power in an amount suitable for driving the load, without causing the storage section to be overcharged. Furthermore, since charging is carried out every time the predetermined operation is carried out, it is possible to reduce the time required for one (1) charging as much as possible. This allows the load to immediately carry out a next operation after the charging. Such a configuration is especially advantageous in a case where the load repeatedly carries out the predetermined operation.

The above-described charge control device may be configured such that, as to the charging to the storage section by the charge control section, the charge control section controls the supply of the electric power from the power source so that the storage section is charged with at least as much as a difference between the inter-terminal voltage of the storage section and the predetermined upper limit voltage as obtained when the inter-terminal voltage of the storage section recovers due to dissolution of a voltage drop in the storage section by stoppage of the load being driven. That is, when driving of the load is stopped, the voltage drop which serves as a trigger for the charging disappears because a drive electric current stops flowing. As a result, the inter-terminal voltage of the storage section increases and recovers. In consideration of the above, the storage control section carries out charging to the storage section until the inter-terminal voltage becomes higher than or equal to the predetermined upper limit voltage. Therefore, suitable charging of the storage section is expected. Note that the charging by the charge control section can be carried out after the driving of the load has been stopped. Alternatively, in consideration of an increase of the voltage due to the dissolution of the voltage drop, the charging by the charge control section may be started, preferably as soon as possible, within a period from a point in time where the inter-terminal voltage of the storage section becomes less than or equal to the predetermined lower limit voltage to a point in time before the driving of the load is stopped.

The charge control device may be configured such that when a situation in which the inter-terminal voltage of the storage section becomes lower than or equal to the predetermined lower limit voltage due to a voltage drop in the storage section while the load is being driven continues for a predetermined period of time or longer, the voltage monitoring section determines that the storage section needs to be charged. According to the configuration, even in a case where the inter-terminal voltage of the storage section momentarily becomes lower than or equal to the predetermined lower limit voltage while the load is being driven, the charging to the storage section is not carried out. This makes it possible to eliminate, as much as possible, an effect of an abrupt change in the inter-terminal voltage of the storage section, which change is due to noise etc. This makes it possible to stably control the charging of the storage section.

The charge control device further includes, in a case where the load carries out a predetermined operation, a forced drive section that forces the load to carry out a predetermined forced operation other than the predetermined operation so that the load is forced to consume a more electric current than it does during the predetermined operation. The charge control device may be configured such that, if the inter-terminal voltage of the storage section becomes less than or equal to the predetermined lower limit voltage due to a voltage drop caused in the storage section when the forced drive section forces the load to carry out the predetermined forced operation, the charge control section carries out charging from the power source to the storage section so that the inter-terminal voltage of the storage section becomes higher than or equal to the predetermined upper limit voltage. That is, according to the configuration, the forced operation other than the predetermined operation causes the voltage drop in the storage section, thereby generating a trigger for charging to the storage section. In a case where an electric current value or the like consumed by the load during the predetermined operation is small, the amount of voltage drop that occurs due to a resistance component and a load current in the storage section while the load is being driven is also small. Therefore, it is difficult to appropriately determine a timing of when to carry out the charging to the storage section. In such a case, a larger voltage drop can be generated by utilizing the voltage drop in the storage section, which is caused by the forced drive section. Therefore, the configuration is advantageous for carrying out charging at appropriate timings. Furthermore, even in a case where the electric current value or the like consumed by the load during the predetermined operation is not so small, it is possible to unfailingly carry out appropriate charging by determining the timing of charging by appropriately combining the predetermined operation and the forced operation.

A further aspect of the present invention is a drive load module which includes the above described charge control device and a load to be driven. That is, the present invention can be a drive load module at least including: the charge control device; a power source that supplies electric power to the storage section; and a load that is supplied with driving electric power from the storage section. This makes it possible to provide an integrated drive load module which includes the storage section that can continuously supply the electric power for driving the load, the power source and the load.

The drive load module can be configured such that the drive load module includes: one or more sensors that detect a predetermined environmental parameter in an area surrounding the drive load module; and a wireless transmission section that transmits a value detected by the one or more sensors to a predetermined receiving section located away from the drive load module. That is, since the sensor(s) and the wireless transmission section that transmits the value detected by the sensor(s) are integral with each other and included in the drive load module of the present invention, it is possible, without continuous supply of electric power from outside, to comprehensively carry out, in the module, continuous supply of electric power, detection by the sensor (s) and the transmission of the detected value to an external device. Therefore, it is possible to improve convenience of the module. Furthermore, since the one or more sensors and the wireless communication section collectively serve as the load of the present invention, it is possible to increase the amount of the voltage drop in the storage section which voltage drop occurs while the load is being driven. Therefore, for example, especially even in a case where the amount of electric power consumed by each of the sensor(s) is small, it is possible to more unfailingly detect the voltage drop in the storage section.

The drive load module can be configured such that the power source includes a vibration power generation device that converts external vibration energy into electric power or a solar power generation device that carries out solar power generation. It is needless to say that the power source can include a power source device which utilizes other environmental energy.

The drive load module can be configured such that, instead of the above configuration regarding the power source, the power source is constituted to include one environmental power generation device that converts environmental energy into electric power and to further at least include a power supply device composed of another environmental power generation device and a power source device capable of external discharging; and the storage section is supplied with electric power selectively from said one environmental power generation device or the power supply device or simultaneously from said one environmental power generation device and the power supply device. That is, since the power source itself has a so-called hybrid configuration which is constituted by a plurality of devices such as a power source device and a power generation device, it is possible to carry out stable supply of electric power. For example, a primary battery can be used as the power source device capable of external discharging. In this case, the one environmental power generation device can be operated as a main power source device, and, in a case where the one environmental power generation device cannot produce enough electric power, the primary battery can be used to support the electric power supply to the storage section. This makes it possible to use the primary battery as long as possible. Alternatively, instead of the primary battery, it is possible to use (i) another storage section for storing electric power generated by another power generation device or (ii) an AC power source device as the "power source device capable of external discharging". Note that the electric power can be supplied to the storage section from (i) either the one environmental power generation device or the power supply device selectively or (ii) both the one environmental power generation device and the power supply device simultaneously. Alternatively, the (i) and (ii) can be carried out alternately in an appropriate manner.

REFERENCE SIGNS LIST

1 Wireless communication module
2 Control device
3 Load
4 Vibration power generation device
6 Storage device
21 Charge control section
22 Discharge control section
23 Voltage monitoring section
34, 35 Dummy load circuit

The invention claimed is:

1. A charge control device comprising:
a storage section that stores electric power supplied from a power source and supplies the stored electric power to a load;
a voltage monitoring section which, if the storage section has its inter-terminal voltage being higher than or equal to a predetermined upper limit voltage, determines that the storage section is on a full charge, and which, if the storage section has its inter-terminal voltage being lower than or equal to a predetermined lower limit voltage which is lower than the predetermined upper limit voltage, determines that the storage section needs to be charged;
a charge control section that controls charging to the storage section in accordance with the inter-terminal voltage of the storage section, the charge control device serving to control a state of charging to the storage section,
if the inter-terminal voltage of the storage section becomes less than or equal to the predetermined lower limit voltage due to a voltage drop caused in the storage section due to a resistance component and a load current in the storage section when the load is being driven by the electric power supplied from the storage section and the voltage monitoring section therefore determines that the storage section needs to be charged, the charge control section, after a predetermined period has passed, starts charging from the power source to the storage section so that the inter-terminal voltage of the storage section becomes higher than or equal to the predetermined upper limit voltage, wherein
the load carries out a predetermined operation composed of a single action or plural actions when supplied with the electric power from the storage section; and
a difference between the predetermined upper limit voltage and the predetermined lower limit voltage is set so that the inter-terminal voltage of the storage section changes from the predetermined upper limit voltage to the predetermined lower limit voltage or lower due to a voltage drop caused in the storage section while the load is carrying out the predetermined operation,
the charge control device further comprising:
a forced drive section that forces the load to carry out a predetermined forced operation other than the predetermined operation so that the load is forced to consume more electric current than it does during the predetermined operation,
wherein while the load is carrying out the predetermined operation, if the inter-terminal voltage of the storage section becomes less than or equal to the predetermined lower limit voltage due to a voltage drop caused in the storage section when the forced drive section forces the load to carry out the predetermined forced operation, the charge control section carries out charging from the power source to the storage section so that the inter-terminal voltage of the storage section becomes higher than or equal to the predetermined upper limit voltage.

2. The charge control device as set forth in claim 1, wherein while the load is carrying out the predetermined operation, the inter-terminal voltage of the storage section is kept higher than or equal to a predetermined drive voltage necessary for driving the load.

3. The charge control device as set forth in claim 1, wherein the charge control section controls the supply of the electric power from the power source so that the storage section is charged with at least as much as a difference between the inter-terminal voltage of the storage section and the predetermined upper limit voltage as obtained when the inter-terminal voltage of the storage section recovers due to dissolution of a voltage drop in the storage section by stoppage of the load being driven.

4. The charge control device as set forth in claim 1, wherein when a situation in which the inter-terminal voltage of the storage section becomes lower than or equal to the predetermined lower limit voltage due to a voltage drop in the storage section while the load is being driven continues for a predetermined period of time or longer, the voltage monitoring section determines that the storage section needs to be charged.

5. A drive load module comprising:
a charge control device;
a power source that supplies electric power to the storage section; and
a load that is supplied with driving electric power from the storage section,
wherein the charge control device comprises:
a storage section that stores electric power supplied from a power source and supplies the stored electric power to a load;
a voltage monitoring section which, if the storage section has its inter-terminal voltage being higher than or equal to a predetermined upper limit voltage, determines that the storage section is on a full charge, and which, if the storage section has its inter-terminal voltage being lower than or equal to a predetermined lower limit voltage which is lower than the predetermined upper limit voltage, determines that the storage section needs to be charged;
a charge control section that controls charging to the storage section in accordance with the inter-terminal voltage of the storage section,
the charge control device serving to control a state of charging to the storage section,
if the inter-terminal voltage of the storage section becomes less than or equal to the predetermined lower limit voltage due to a voltage drop caused in the storage section due to a resistance component and a load current in the storage section when the load is being driven by the electric power supplied from the storage section and the voltage monitoring section therefore determines that the storage section needs to be charged, the charge control section, after a predetermined period has passed, starts charging from the power source to the storage section so that the inter-terminal voltage of the storage section becomes higher than or equal to the predetermined upper limit voltage, wherein
the load carries out a predetermined operation composed of a single action or plural actions when supplied with the electric power from the storage section; and
a difference between the predetermined upper limit voltage and the predetermined lower limit voltage is set so that the inter-terminal voltage of the storage section changes from the predetermined upper limit voltage to the predetermined lower limit voltage or lower due to a voltage drop caused in the storage section while the load is carrying out the predetermined operation,
the drive load module further comprising:
a forced drive section that forces the load to carry out a predetermined forced operation other than the predetermined operation so that the load is forced to consume more electric current than it does during the predetermined operation,
wherein while the load is carrying out the predetermined operation, if the inter-terminal voltage of the storage section becomes less than or equal to the predetermined lower limit voltage due to a voltage drop caused in the storage section when the forced drive section forces the load to carry out the predetermined forced operation, the char e control section carries out charging from the power source to the storage section so that the inter-terminal voltage of the storage section becomes higher than or equal to the predetermined upper limit voltage.

6. The drive load module as set forth in claim 5, wherein the load includes:
one or more sensors that detect a predetermined environmental parameter in an area surrounding the drive load module; and a wireless transmission section that transmits a value detected by the one or more sensors to a predetermined receiving section located away from the drive load module.

7. The drive load module as set forth in claim 5, wherein the power source includes a vibration power generation device that converts external vibration energy into electric power or a solar power generation device that carries out solar power generation.

8. The drive load module as set forth in claim 5, wherein:
the power source is constituted to include one environmental power generation device that converts environmental energy into electric power and to further at least include a power supply device composed of another environmental power generation device and a power source device capable of external discharging; and
the storage section is supplied with electric power selectively from said one environmental power generation device or the power supply device or simultaneously from said one environmental power generation device and the power supply device.

9. A charge control method for controlling a state of charging to a storage section that stores electric power supplied from a power source and supplies the stored electric power to a load,
the state of charging being controlled in accordance with a criterion of determination by which, if the storage section has its inter-terminal voltage being higher than or equal to a predetermined upper limit voltage, it is determined that the storage section is on a full charge, and by which, if the storage section has its inter-terminal voltage being lower than or equal to a predetermined lower limit voltage which is lower than the predetermined upper limit voltage, it is determined that the storage section needs to be charged,
the charge control method comprising the steps of:
detecting whether the inter-terminal voltage of the storage section becomes less than or equal to the predetermined lower limit voltage due to a voltage drop caused in the storage section due to a resistance component and a load current in the storage section when the load is being driven by the electric power supplied from the storage section; and
if the inter-terminal voltage of the storage section becomes less than or equal to the predetermined lower limit voltage, causing the power source, after a predetermined period has passed, to charge the storage section so that the inter-terminal voltage of the storage section becomes higher than or equal to the predetermined upper limit voltage, wherein
the load carries out a predetermined operation composed of a single action or plural actions when supplied with the electric power from the storage section; and
a difference between the predetermined upper limit voltage and the predetermined lower limit voltage is set so that the inter-terminal voltage of the storage section changes from the predetermined upper limit voltage to the predetermined lower limit voltage or lower due to a voltage drop caused in the storage section while the load is carrying out the predetermined operation,
the charge control method further comprising:
forcing the load to carry out a predetermined forced operation other than the predetermined operation so that the load is forced to consume more electric current than it does during the predetermined operation,
wherein while the load is carrying out the predetermined operation, if the inter-terminal voltage of the storage section becomes less than or equal to the predetermined lower limit voltage due to a voltage drop caused in the storage section when the forced drive section forces the load to carry out the predetermined forced operation, the charge control section carries out charging from the power source to the storage section so that the inter-terminal voltage of the storage section becomes higher than or equal to the predetermined upper limit voltage.

\* \* \* \* \*